(12) United States Patent
Sakakibara et al.

(10) Patent No.: US 11,148,300 B2
(45) Date of Patent: Oct. 19, 2021

(54) ROBOTIC GRIPPING DEVICE

(71) Applicant: FANUC CORPORATION, Yamanashi (JP)

(72) Inventors: Shinsuke Sakakibara, Yamanashi (JP); Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 166 days.

(21) Appl. No.: 16/562,927

(22) Filed: Sep. 6, 2019

(65) Prior Publication Data
US 2020/0078959 A1    Mar. 12, 2020

(30) Foreign Application Priority Data

Sep. 11, 2018  (JP) .............................. JP2018-169684

(51) Int. Cl.
  *B25J 15/02*  (2006.01)
  *B25J 15/00*  (2006.01)
  *F16H 25/22*  (2006.01)

(52) U.S. Cl.
  CPC ......... *B25J 15/028* (2013.01); *B25J 15/0028* (2013.01); *F16H 25/2204* (2013.01)

(58) Field of Classification Search
  CPC ...... B25J 15/028; B25J 15/0028; B25J 15/12; B25J 15/0475; B25J 15/026; B25J 15/10; B25J 15/0009; F16H 25/2204; F16H 2025/2081
  See application file for complete search history.

(56) References Cited

U.S. PATENT DOCUMENTS

| | | | |
|---|---|---|---|
| 4,781,519 A | 11/1988 | Monforte | |
| 5,050,919 A | 9/1991 | Yakou | |
| 5,562,320 A | 10/1996 | Bloomberg et al. | |
| 8,936,289 B1 * | 1/2015 | Kozlowski | B25J 15/08 294/106 |
| 2014/0180477 A1 * | 6/2014 | Chung | B25J 13/082 700/258 |
| 2015/0151433 A1 * | 6/2015 | Rust | B25J 15/0213 294/106 |
| 2016/0121489 A1 * | 5/2016 | Moore | B25J 15/0009 294/198 |
| 2017/0203443 A1 * | 7/2017 | Lessing | B25J 15/0014 |

FOREIGN PATENT DOCUMENTS

| | | |
|---|---|---|
| CN | 207509243 U | 6/2018 |
| JP | S6075380 U | 5/1985 |
| JP | H0174084 U | 5/1989 |
| JP | H01183386 A | 7/1989 |

(Continued)

OTHER PUBLICATIONS

Japanese Notice of Reasons for Refusal dated Sep. 23, 2020, for Japanese Patent Application No. 2018169684.

*Primary Examiner* — Stephen A Vu
(74) *Attorney, Agent, or Firm* — Karceski IP Law, PLLC

(57) ABSTRACT

A robotic gripping device includes a base part attached to a tip of a wrist of a robot; finger parts, at least one of which is movably supported on the base part so that the finger parts can move toward and away from each other; and a driving mechanism that drives the finger parts. In at least one of the finger parts, flexibility of at least a gripping surface is switchable.

6 Claims, 13 Drawing Sheets

(56) References Cited

FOREIGN PATENT DOCUMENTS

| | | | |
|---|---|---|---|
| JP | H02106289 | A | 4/1990 |
| JP | H02303785 | A | 12/1990 |
| JP | H04-063691 | A | 2/1992 |
| JP | 2000-174108 | A | 6/2000 |
| JP | 2001-001289 | A | 1/2001 |
| JP | 2001-096484 | A | 4/2001 |
| JP | 2007118148 | A | 5/2007 |
| JP | 2011240422 | A | 12/2011 |
| JP | 2012-240182 | A | 12/2012 |
| JP | 2013-158895 | A | 8/2013 |
| JP | 2013169633 | A | 9/2013 |

* cited by examiner

ROBOTIC GRIPPING DEVICE

CROSS-REFERENCE TO RELATED APPLICATIONS

This application is based on and claims priority to Japanese Patent Application No. 2018-169684, filed on Sep. 11, 2018, the entire contents of which are incorporated herein by reference.

FIELD OF THE INVENTION

The present invention relates to a robotic gripping device.

BACKGROUND OF THE INVENTION

Heretofore, a robotic gripping device including a pair of openable/closable fingers and small fingers that can be freely protracted from and retracted to these fingers is known (for example, refer to Japanese Unexamined Patent Application, Publication No. 4-63691).

When a large workpiece is to be handled with this robotic gripping device, the task is performed while the small-size fingers are housed inside the fingers; when a small workpiece is to be handled or when a workpiece is to be handled in a narrow space, the small-size fingers are protracted and the workpiece is gripped with the protracted small-size fingers.

SUMMARY OF THE INVENTION

According to an aspect of the present invention, there is provided a robotic gripping device that includes a base part to be attached to a tip of a wrist of a robot; a plurality of finger parts, at least one of which is movably supported on the base part so that that the finger parts can move toward and away from each other; and a driving mechanism that drives each of the plurality of finger parts, in which, in at least one of the finger parts, flexibility of at least a gripping surface is switchable.

In the aspect described above, a control unit that controls the driving mechanism may be further provided, and, in response to the switching of the flexibility of the gripping surface of the finger part, the control unit may switch a control system for the driving mechanism.

In the aspect described above, the finger part may include two types of finger members that can move relative to each other in a longitudinal axis direction of the finger part and that have the gripping surfaces having different flexibility, and a switching mechanism that moves the finger members relative to each other.

In the aspect described above, the finger part may include a cylindrical first finger member that is fixed so as not to move in the longitudinal axis direction and that has an opening at a tip, and a second finger member that has the gripping surface having flexibility higher than that of the first finger member and that can protract from and retract to an interior of the first finger member in the longitudinal axis direction through the opening.

In the aspect described above, the finger part may include a second finger member that is fixed so as not to move in the longitudinal axis direction, and a first finger member that has the gripping surface having flexibility lower than that of the second finger member and that is configured to move between a position at which the first finger member covers the gripping surface of the second finger member and a position at which the first finger member exposes the gripping surface of the second finger member.

In the aspect described above, the finger part may include a finger member that has two types of the gripping surfaces disposed about a longitudinal axis of the finger part, the gripping surfaces having different flexibility, and a switching mechanism that switches the gripping surface by rotating the finger member about the longitudinal axis.

In the aspect described above, the finger part may include a hollow first finger member that has a first gripping surface on an outer circumferential side of the finger part and at least one through hole penetrating in a thickness direction, a second finger member that can be protracted from and retracted to the first gripping surface through the through hole, the second finger member having higher flexibility than the first finger member, and a second gripping surface having higher flexibility than the first gripping surface may be formed by causing the second finger member to protrude from the first gripping surface.

DESCRIPTION OF EMBODIMENT(S) OF THE INVENTION

A robotic gripping device 1 according to one embodiment of the present invention will now be described with reference to the drawings.

Figure 1:
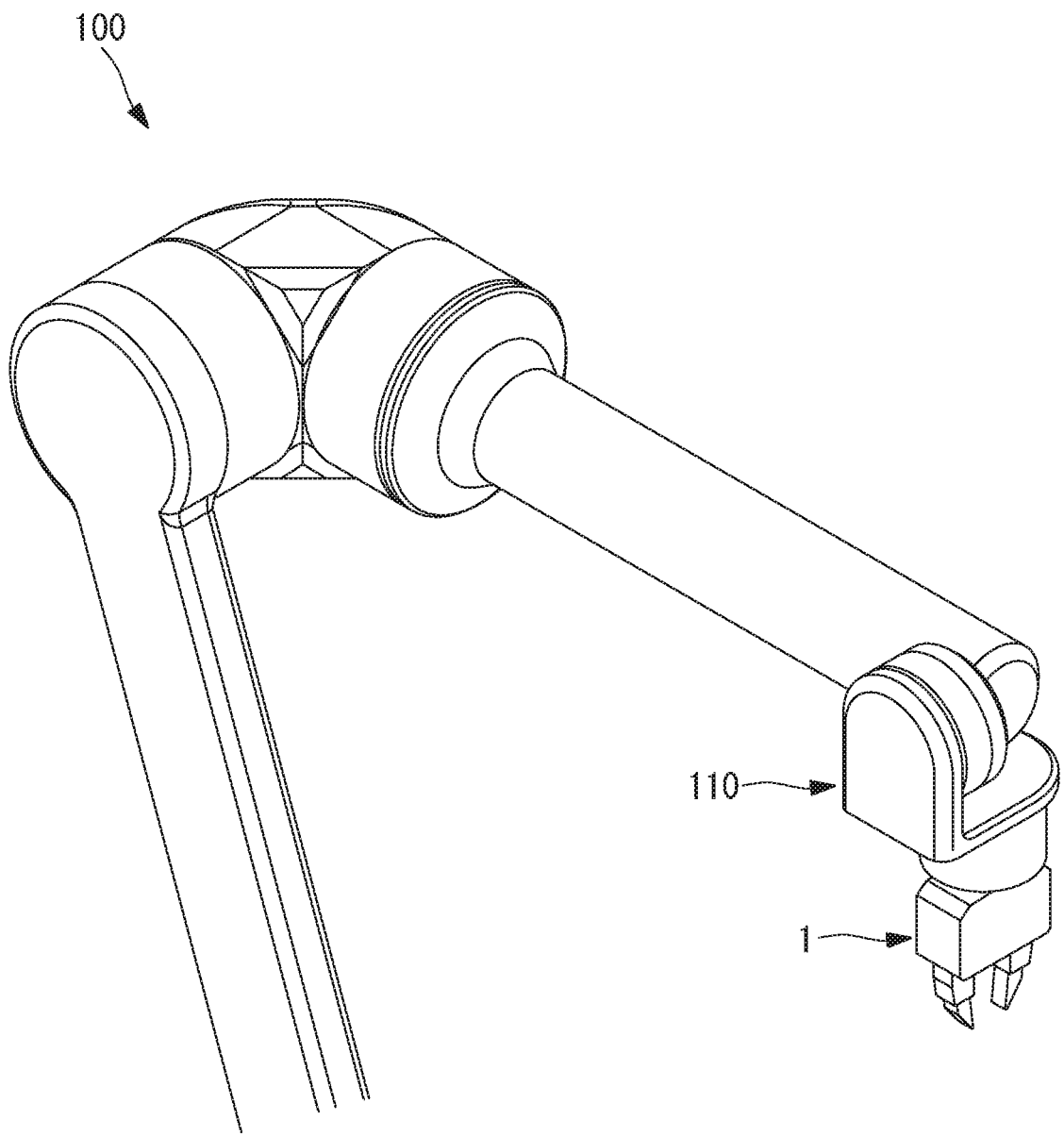
FIG. 1 is a partial perspective view of a robot to which a robotic gripping device according to one embodiment of the present invention is attached.

As illustrated in FIG. 1, the robotic gripping device 1 of this embodiment is attached to a tip of a wrist 110 of a robot 100 and used.

Figure 2:
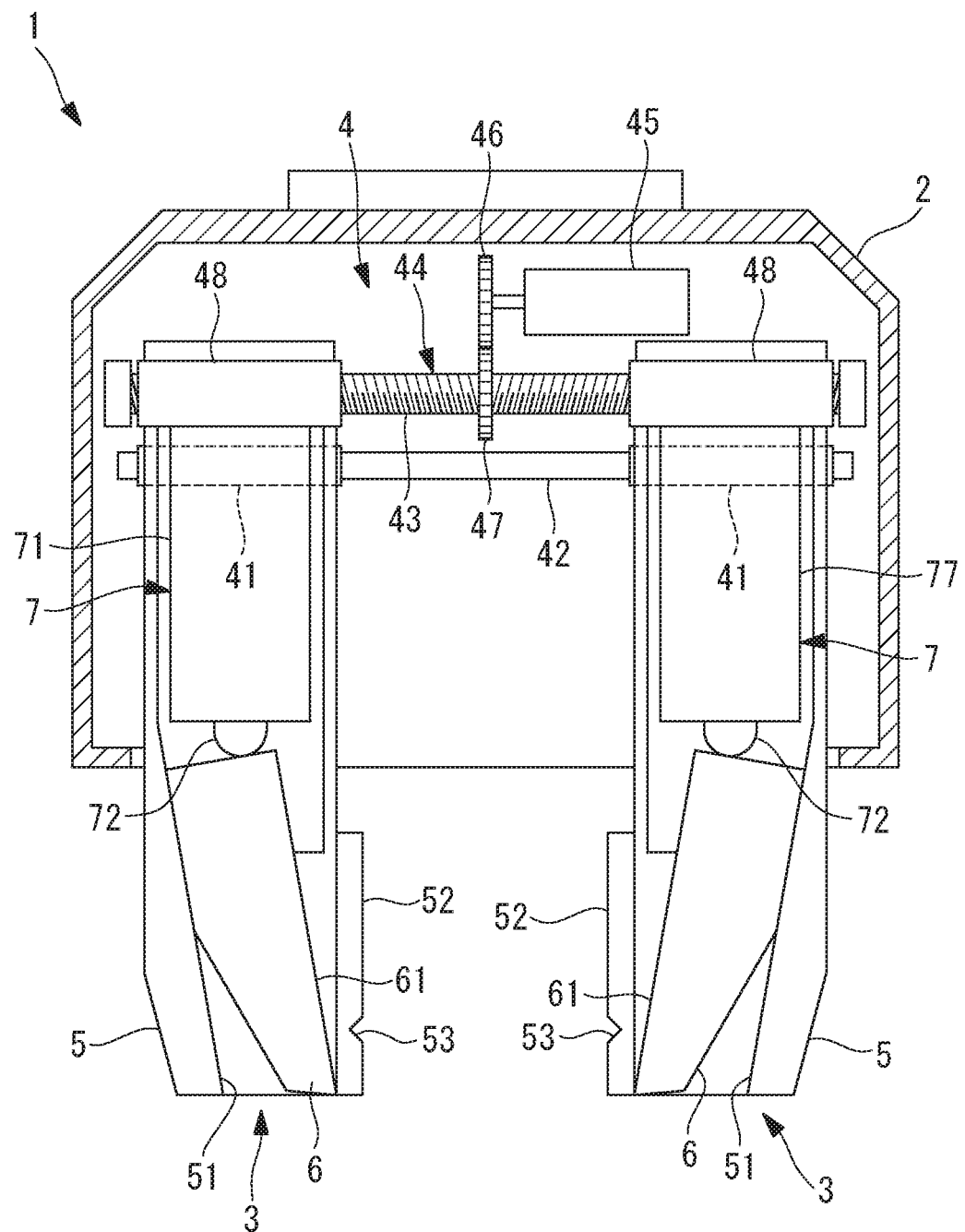
FIG. 2 is a vertical sectional view illustrating one example of an internal structure of the robotic gripping device illustrated in FIG. 1 and illustrates a state in which a hard workpiece is gripped.
Figure 3:
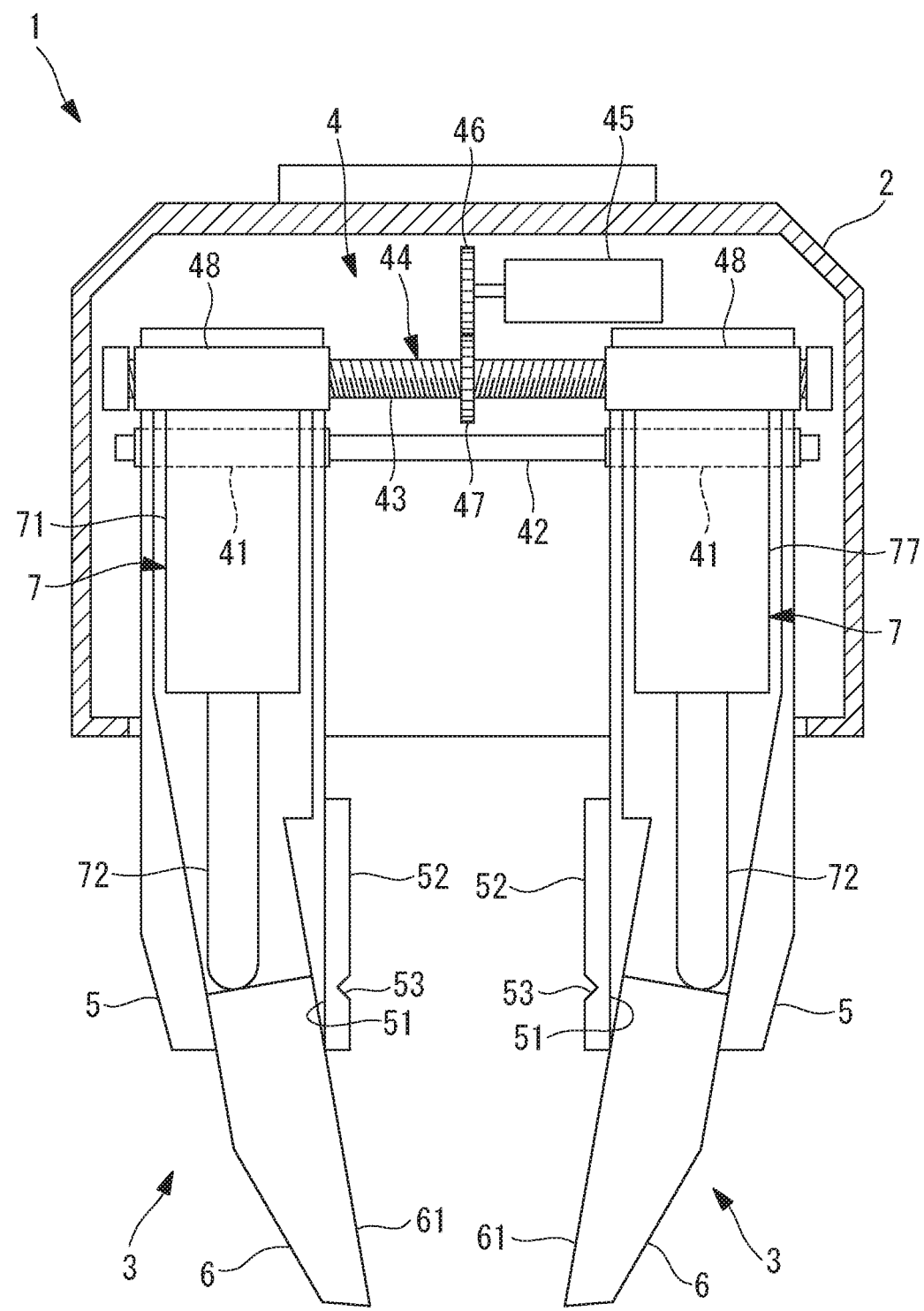
FIG. 3 is a vertical sectional view illustrating one example of an internal structure of the robotic gripping device illustrated in FIG. 1 and illustrates a state in which a soft workpiece is gripped.

As illustrated in FIGS. 2 and 3, the robotic gripping device 1 is equipped with a base part 2 fixed to the tip of the wrist 110 of the robot 100, a pair of finger parts 3 supported on the base part 2 such that the finger parts 3 can move toward or away from each other, and a driving mechanism 4 that drives the finger parts 3.

Figure 4:
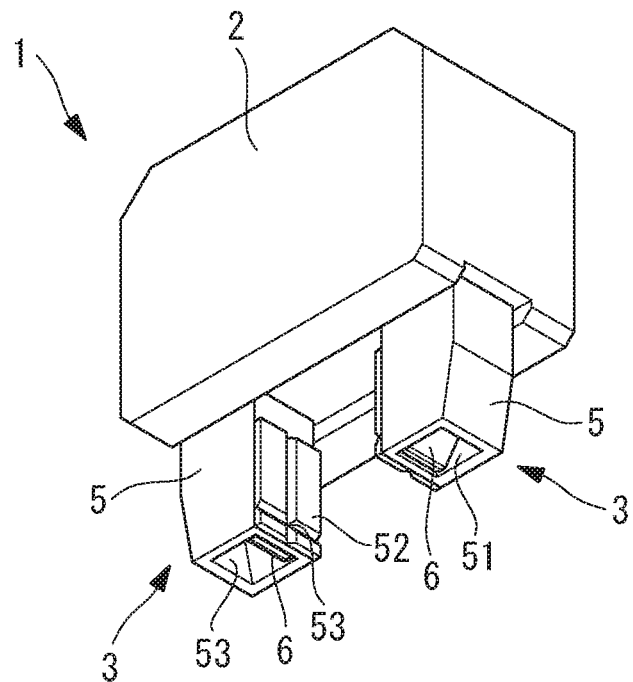
FIG. 4 is a perspective view of the robotic gripping device in the state illustrated in FIG. 2.

As illustrated in FIGS. 2 to 4, the finger parts 3 are each equipped with a first finger member (finger member) 5 having a rectangular prism shape and having an opening 51 at a tip in a longitudinal axis direction, a second finger member (finger member) 6 configured to move between a state in which the second finger member 6 is housed inside the first finger member 5 and a state in which the second finger member protrudes from the opening 51 in a tip direction, and a switching mechanism 7 that switches the state of the second finger member 6.

The first finger member 5 is composed of a relatively hard material having low flexibility, for example, a stainless steel alloy or an aluminum alloy. The first finger members 5 respectively have first gripping surfaces (gripping surfaces) 52 that face each other, and a hard workpiece (refer to FIG. 8) W1 is gripped between these surfaces. As illustrated in FIG. 4, each first gripping surface 52 has, for example, a cross-shaped groove 53 formed therein so that a workpiece W1 having a curved surface can be stably gripped by two or more contact points formed by the groove 53.

The second finger members 6 are composed of a relatively soft material, for example, a highly flexible resin material such as rubber. The second finger members 6 respectively have second gripping surfaces (gripping surfaces) 61 that oppose each other, and a soft workpiece (refer to FIG. 10) W2 is gripped between these surfaces. The second gripping surfaces 61 deform along the contour of the workpiece W2 when pressed against the workpiece W2 and thus can make close contact with the outer surface of the workpiece W2.

As illustrated in FIGS. 2 and 3, the switching mechanism 7 is, for example, a linear motion mechanism such as an air cylinder. When a hard workpiece W1 is to be gripped, the switching mechanism 7 withdraws the second finger members 6 with respect to the first finger members 5 so that the second finger members 6 are inside the first finger members 5 and only the first gripping surfaces 52 of the first finger members 5 are exposed. When a soft workpiece W2 is to be gripped, the switching mechanism 7 causes the second finger members 6 to protrude with respect to the first finger members 5 from the openings 51 at the tips of the first finger members 5 so that the second gripping surfaces 61 of the second finger members 6 are exposed on the tip side of the first finger members 5 with respect to the first gripping surfaces 52 of the first finger members 5. A spring (not illustrated) is disposed between the first finger member 5 and the second finger member 6. When a rod 72 of an air cylinder 71 is withdrawn, the second finger member 6 is withdrawn into the interior of the first finger member 5 by the spring.

Alternatively, although not illustrated, a structure in which the rod 72 of the air cylinder 71 is coupled to the base of the second finger member 6 via a universal joint or the like may be employed.

When the second finger member 6 is to be made to protrude, the switching mechanism 7 causes the second finger member 6 to protrude not only in the longitudinal axis direction of the first finger member 5 but also in an oblique direction so that the second finger member 6 moves closer toward the other opposing finger part 3. In this manner, the gripping surface 61 of each second finger member 6 can be positioned on the other opposing finger part 3 side with respect to the gripping surface 52 of the first finger member. Thus, when the soft workpiece W2 is gripped with the second finger members 6, the workpiece W2 can be gripped at a position where the first finger members 5 do not contact each other.

As illustrated in FIGS. 2 and 3, for example, the driving mechanism 4 is equipped with a linear guide 42 that is fixed to the base part 2 and movably supports a slider 41 to which the pair of finger parts 3 is fixed; a ball screw 44 having a threaded portion 43 having a portion threaded in one direction from one end to the center and another portion threaded in the opposite direction from the other end to the center with a gear 47 at the border between these portions; and a motor 45 and two gears 46 and 47 that rotate and drive the ball screw 44. Nuts 48 respectively corresponding to the threading directions of the portions of the threaded portion 43 are fastened to the ball screw 44, and are fixed to the respective first finger members 5. The gear 46 is fixed to a shaft of the motor 45, meshes with the gear 47 that is fixed to the ball screw 44 and rotates in total synchronization, and transmits the torque from the motor 45 to the ball screw 44.

Figure 5:
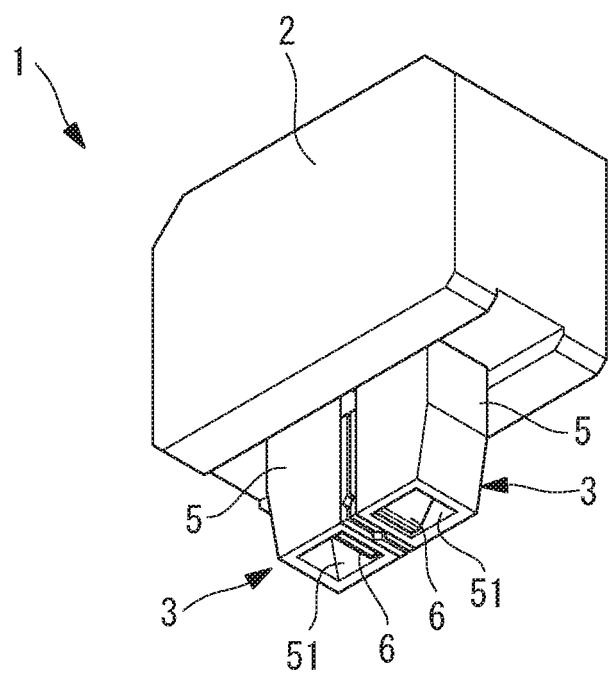
FIG. 5 is a perspective view of the robotic gripping device in a state in which finger parts are closed from the state illustrated in FIG. 4.
Figure 6:
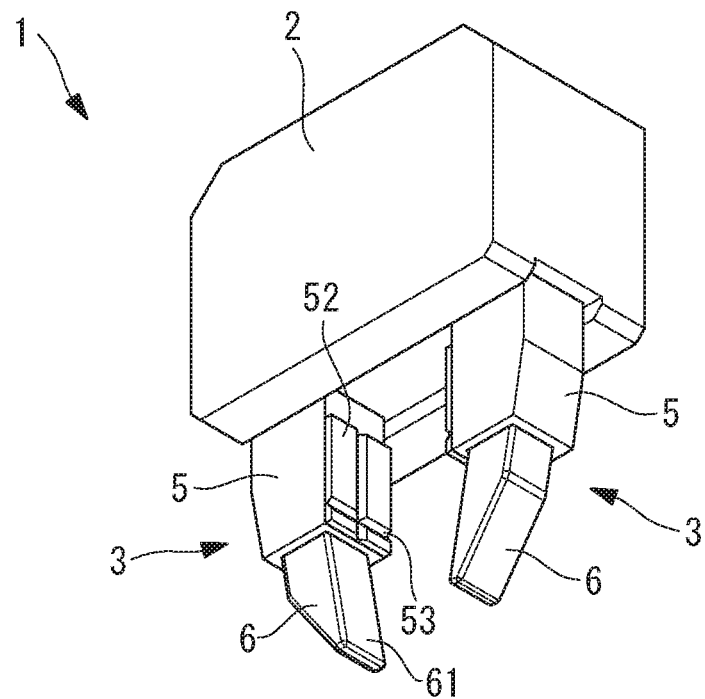
FIG. 6 is a perspective view of the robotic gripping device in the state illustrated in FIG. 3.
Figure 7:
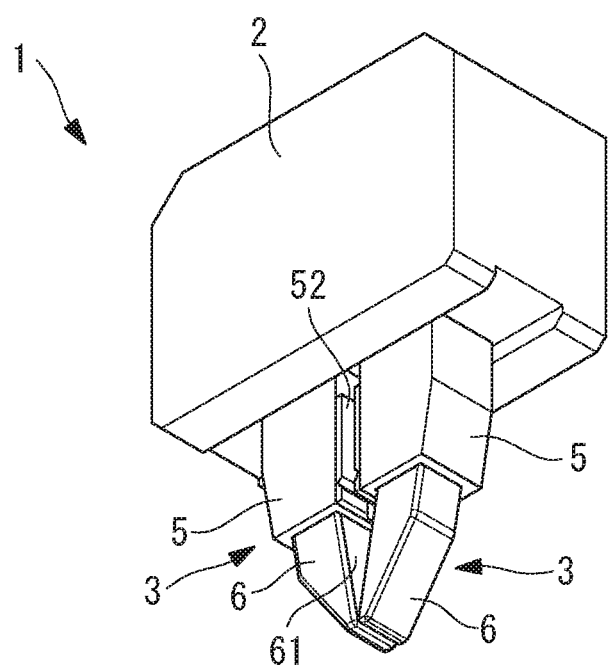
FIG. 7 is a perspective view of the robotic gripping device in a state in which finger parts are closed from the state illustrated in FIG. 6.

When the ball screw 44 is driven by the motor 45 and rotated in one direction, the two nuts 48 move away from each other. When the ball screw 44 is rotated in the other direction, the two nuts 48 move toward each other. As a result, the pair of first finger members 5 fixed to the nuts 48 are caused to move between an open position in which the first finger members 5 are spaced from each other as illustrated in FIGS. 4 and 6 and a closed position in which the first finger members 5 are close to each other as illustrated in FIGS. 5 and 7.

The operation of the robotic gripping device 1 of this embodiment having the aforementioned structure will now be described.

When a hard workpiece W1 is to be gripped with the robotic gripping device 1 of this embodiment, the switching mechanism 7 is actuated to withdraw the rods 72 of the air cylinders 71 so that, as illustrated in FIG. 2, the second finger members 6 are withdrawn to be inside the first finger members 5 by the elastic restoring force of the springs. In this state, the motor 45 of the driving mechanism 4 is actuated, and, as illustrated in FIG. 4, the pair of finger parts 3 is positioned to be apart from each other. Then, the robot 100 is operated to place the workpiece W1 between the pair of finger parts 3.

Figure 8:
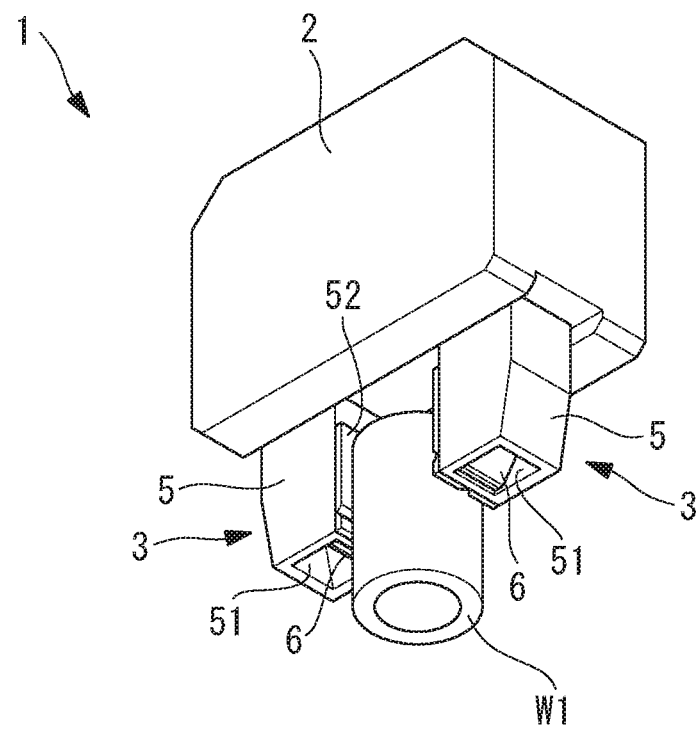
FIG. 8 is a perspective view illustrating a state in which a hard workpiece is gripped with the robotic gripping device in the state illustrated in FIG. 2.
Figure 9:
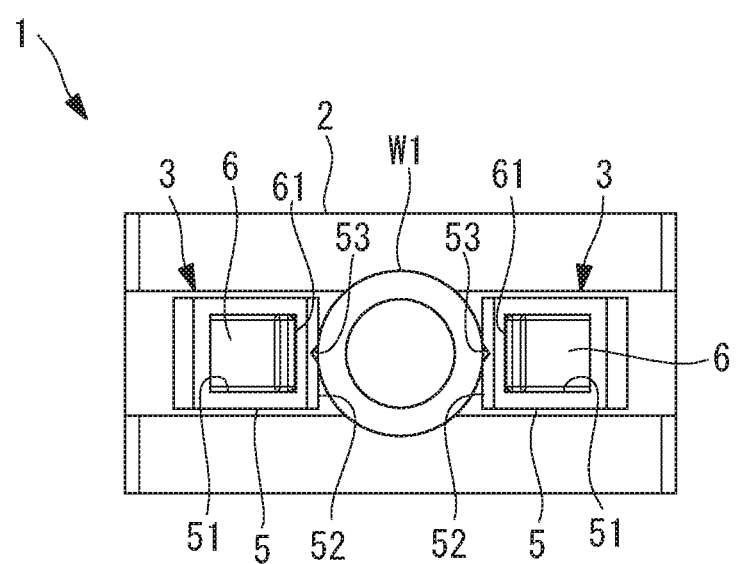
FIG. 9 is a front view of the robotic gripping device in the state illustrated in FIG. 8.

The motor 45 of the driving mechanism 4 is then actuated to bring the pair of finger parts 3 close to each other. As a result, as illustrated in FIGS. 8 and 9, the hard workpiece W1 can be gripped between the gripping surfaces 52 of the first finger members 5 of the pair of finger parts 3. Since the gripping surfaces 52 of the first finger members 5 are relatively hard, the gripping force can be applied to the workpiece W1 to securely grip the workpiece W1. Since the cross-shaped grooves 53 are formed in the gripping surfaces 52, as illustrated in FIGS. 8 and 9, there is an advantage in that even a workpiece W1 having a curved outer surface can be securely gripped due to the two or more contact points formed by the grooves 53.

Next, when a soft workpiece W2 is to be gripped with the robotic gripping device 1 of this embodiment, the switching mechanism 7 is actuated to cause the rods 72 of the air cylinders 71 to protrude so that, as illustrated in FIG. 3, the second finger members 6 protrude from the openings 51 at the tips of the first finger members 5 toward the tip side. In this state, the motor 45 of the driving mechanism 4 is actuated, and, as illustrated in FIG. 6, the pair of finger parts 3 is positioned to be apart from each other. Then, the robot 100 is operated to place the workpiece W2 between the pair of finger parts 3.

Figure 10:
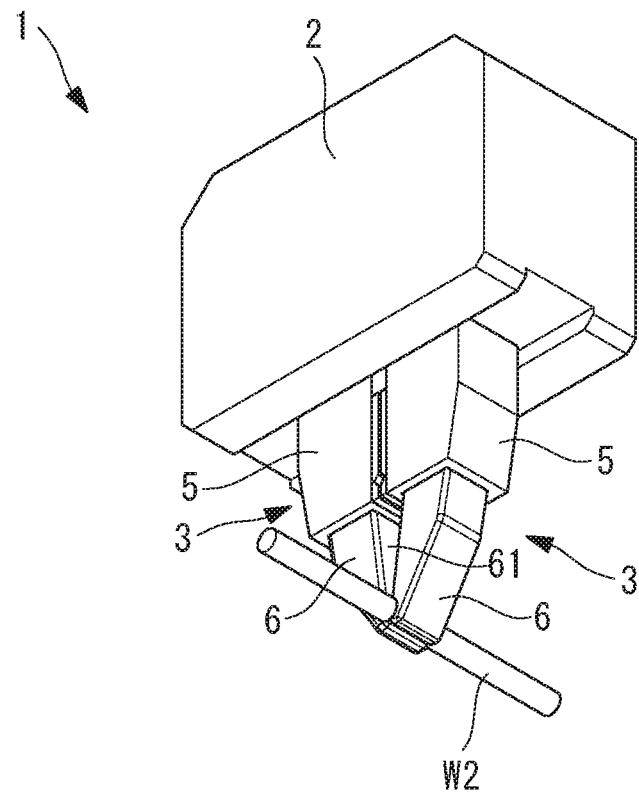
FIG. 10 is a perspective view illustrating a state in which a soft workpiece is gripped with the robotic gripping device in the state illustrated in FIG. 3.
Figure 11:
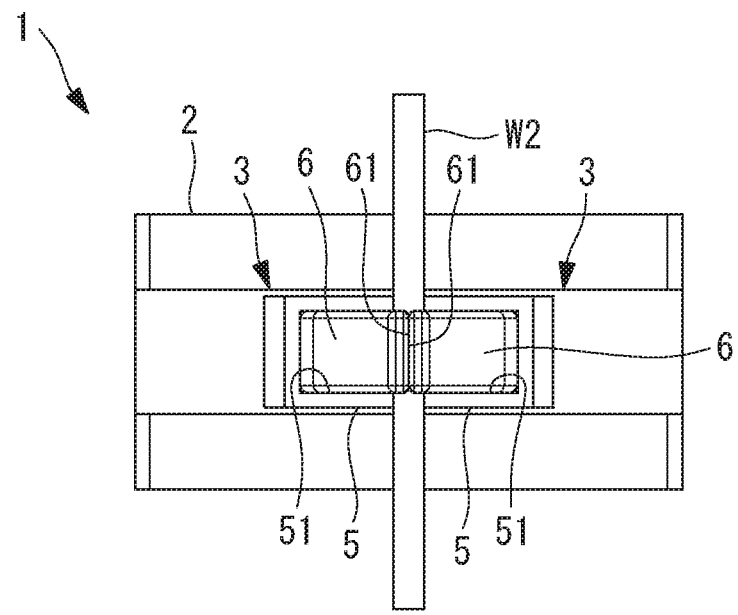
FIG. 11 is a front view of the robotic gripping device in the state illustrated in FIG. 10.

The motor 45 of the driving mechanism 4 is then actuated to bring the pair of finger parts 3 close to each other. As a result, as illustrated in FIGS. 10 and 11, the soft workpiece W2 can be gripped between the gripping surfaces 61 of the second finger members 6 of the pair of finger parts 3. Since the gripping surfaces 61 of the second finger members 6 have high flexibility compared to the gripping surfaces 52 of the first finger members 5, the gripping surfaces 61 deform without squashing the soft workpiece W2, make close contact with the outer surface of the workpiece W2, and can securely grip the workpiece W2.

As such, the robotic gripping device 1 of this embodiment is advantageous in that both the hard workpiece W1 and the soft workpiece W2 can be handled.

In other words, by switching between the finger members 5 and 6 depending on the hardness of the workpieces W1 and W2, the workpieces W1 and W2 can be securely gripped by the gripping surfaces 52 and 61 that are suitable for the hardness.

Another advantages is that, by switching to the soft gripping surfaces 61, a soft workpiece W2 can be gripped, and, in addition, even when a hard workpiece W1 having a cross-sectional shape other than a circle is to be gripped, there is no need to change the orientation of the robotic gripping device 1 according to the cross-sectional shape of the workpiece W1 since the gripping surfaces 61 can deform.

According to this embodiment, two types of the finger members 5 and 6 are switched, and are opened and closed by the same driving mechanism 4. Thus, the space occupied by the driving mechanism 4 can be decreased, the size of the device can be reduced, and, thus, interference with surrounding members can be reduced. Since the two types of the finger members 5 and 6 are not driven by separate driving mechanisms, the device can be made lightweight, and the weights of the workpieces W1 and W2 that can be handled with the robot 100 can be increased.

In such a case, the position of the workpiece W1 gripped by the first finger members 5 and the position of the workpiece W2 gripped by the second finger members 6 differ from each other in the length direction of the finger parts 3. To address this, the tool center point of the teaching program for the robot 100 may be switched in response to the switching between the finger members 5 and 6. Since the gripping force of the first finger members 5 applied to the workpiece W1 and the gripping force of the second finger members 6 applied to the workpiece W2 are different from each other, a control unit that controls the driving mechanism 4 may be provided so that the control unit switches the control system of the driving mechanism 4, for example, the control gain or the control property, in response to the switching of the flexibility of the gripping surfaces 52 and 61. Since one motor is used to control the movement of the two finger members 5 and 6, the movement of the finger members 5 and 6 can be perfectly synchronized, and the gripping force can be easily controlled.

In this embodiment, an example in which two finger parts 3 form one set is described; alternatively, three or more finger parts 3 may be provided.

Although an example is given in which both finger parts 3 are capable of switching the hardness by using the grasping surfaces 52 and 61, the configuration is not limited to this. For example, at least one of the finger parts 3 may be capable of switching the hardness by using the gripping surfaces 52 and 61. Since the finger parts 3 may have any structure as long as they move relative to each other, a structure in which one of the finger parts 3 is fixed to the base part 2 and does not move may be employed.

Although each finger part 3 is equipped with a cylindrical first finger member 5 and a second finger member 6 that can be protracted and retracted through an opening 51 at a tip of the first finger member 5, the structure is not limited to this. Alternatively, as illustrated in FIGS. 12 to 15, a gripping surface 52 of the first finger member 5 having a plate shape with low flexibility may be provided on the gripping surface 61 of each second finger member 6 having a high flexibility so that the gripping surface 52 can be protracted from and retracted to the base part 2.

As illustrated in FIGS. 12 to 15, this flat plate-shaped first finger member 5 may be protracted from and retracted to the base part 2 in linear motion in the longitudinal axis direction of the second finger member 6 or, although not illustrated in the drawings, may be protracted from and retracted to the base part 2 by a rotary motion.

Figure 14:
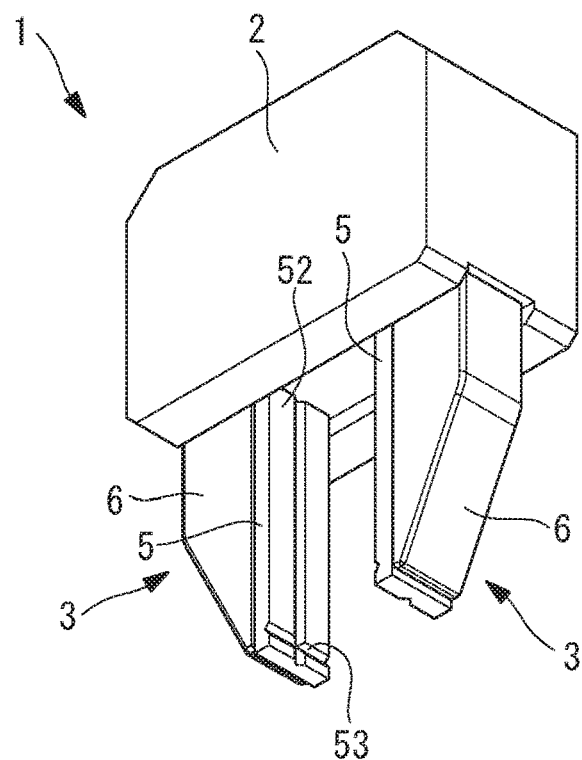
FIG. 14 is a perspective view illustrating a state in which a hard workpiece is gripped with the robotic gripping device illustrated in FIG. 12.
Figure 15:
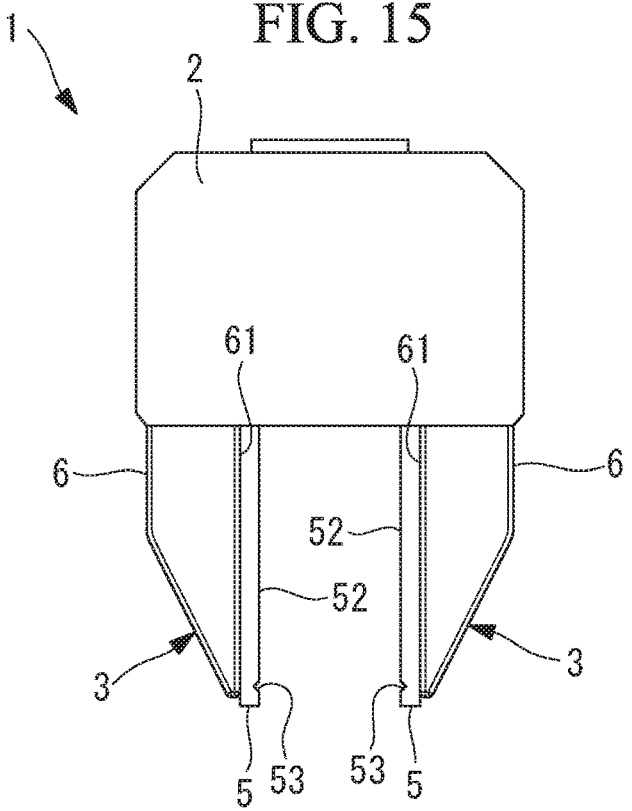
FIG. 15 is a side view of the robotic gripping device illustrated in FIG. 14.
Figure 16:
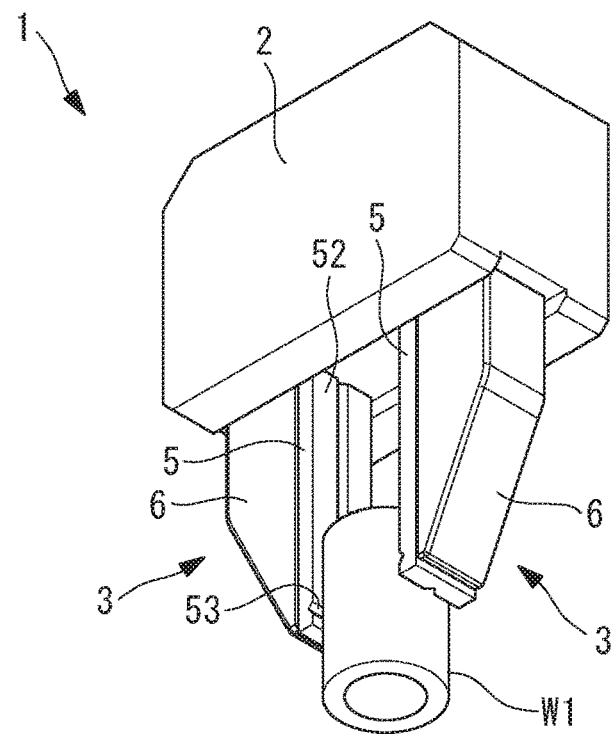
FIG. 16 is a perspective view illustrating a state in which a hard workpiece is gripped with the robotic gripping device in the state illustrated in FIG. 14.

In other words, as illustrated in FIGS. 14 and 15, in a state in which the first finger member 5 has been made to protrude from the base part 2, the first finger member 5 does not completely cover the second finger member 6, but only the gripping surface 61 of the second finger member 6 is replaced by the first finger member 5. As a result, as illustrated in FIG. 16, a hard workpiece W1 can be gripped between the first finger members 5.

Figure 12:
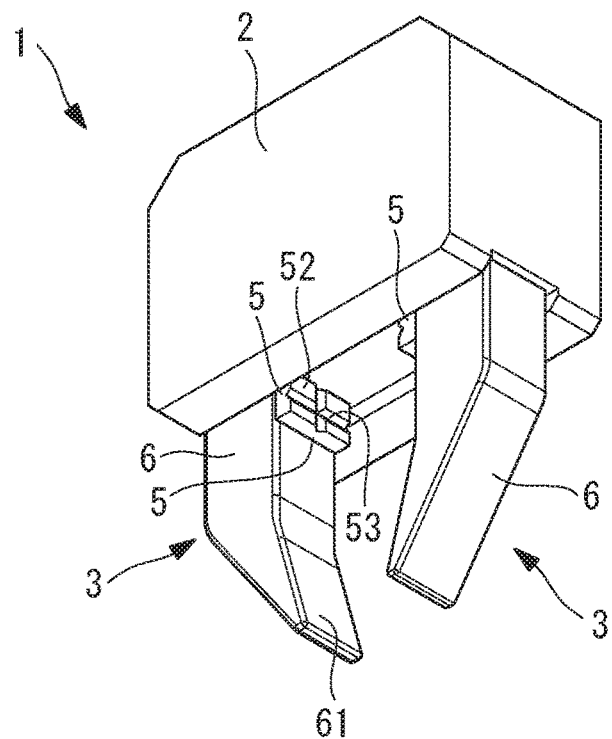
FIG. 12 is a perspective view of a modification of the robotic gripping device illustrated in FIG. 2 and illustrates a state in which a soft workpiece is gripped.
Figure 13:
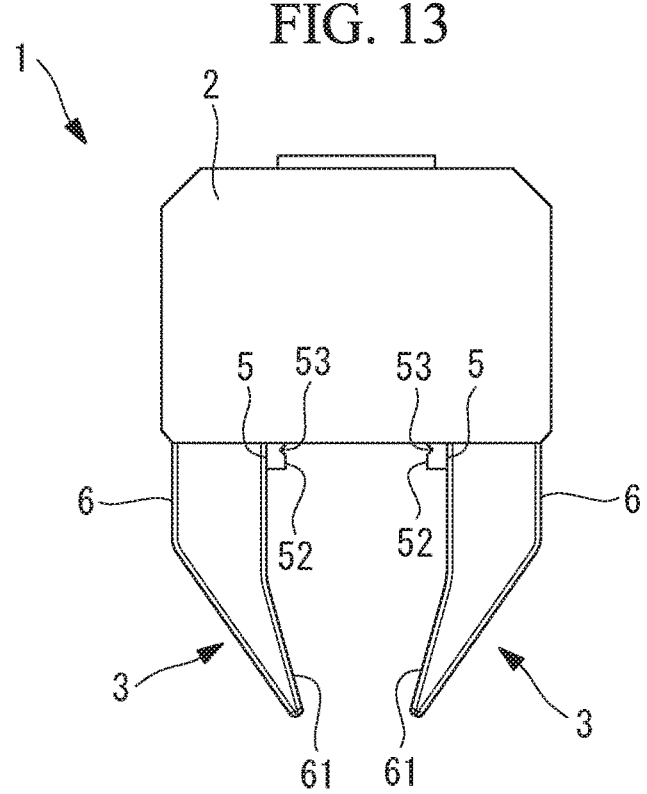
FIG. 13 is a side view of the robotic gripping device illustrated in FIG. 12.
Figure 17:
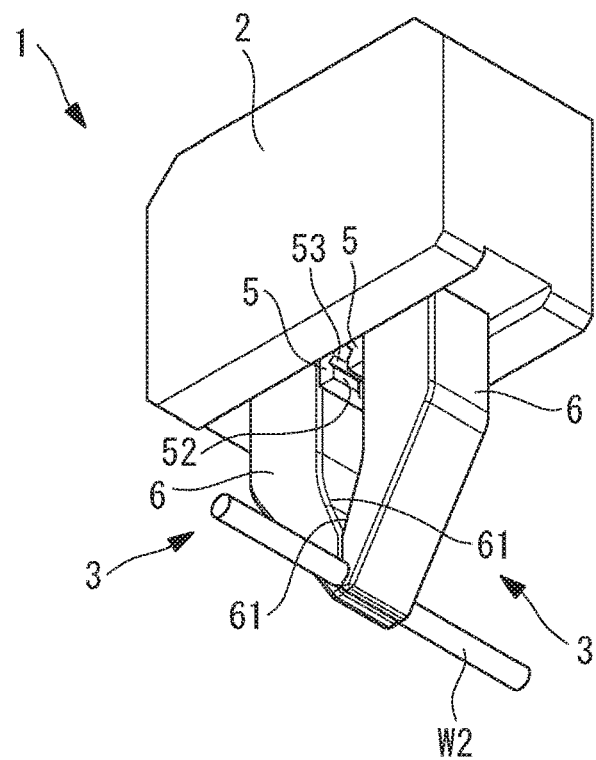
FIG. 17 is a perspective view illustrating a state in which a soft workpiece is gripped with the robotic gripping device in the state illustrated in FIG. 12.

Meanwhile, as illustrated in FIGS. 12 and 13, when the first finger member 5 is withdrawn to be inside the base part 2, the gripping surface 61 of the second finger member 6 is exposed. Thus, as illustrated in FIG. 17, the soft workpiece W2 can be gripped by the second finger members 6. This is advantageous in that switching between the gripping surfaces 52 of the first finger members 5 and the gripping surfaces 61 of the second finger members 6 can be performed at substantially the same position, and there is no need to switch the tool center point.

Figure 18:
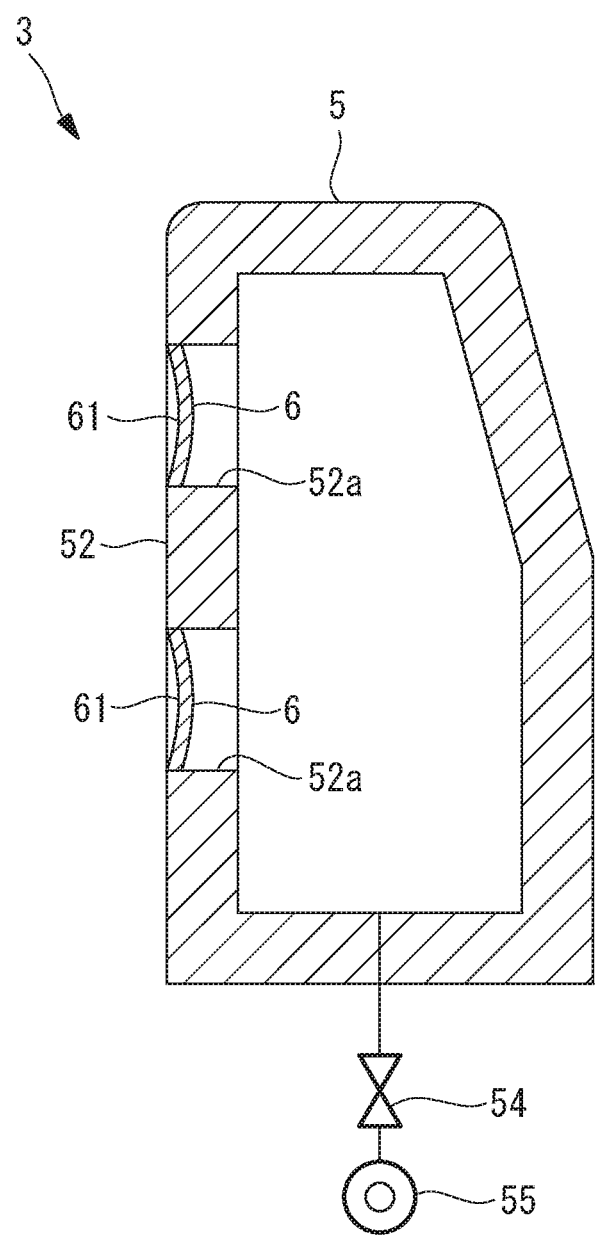
FIG. 18 is a schematic vertical sectional view of one of finger parts according to another modification of the robotic gripping device illustrated in FIG. 2 and illustrates a state in which a hard workpiece is gripped.
Figure 19:
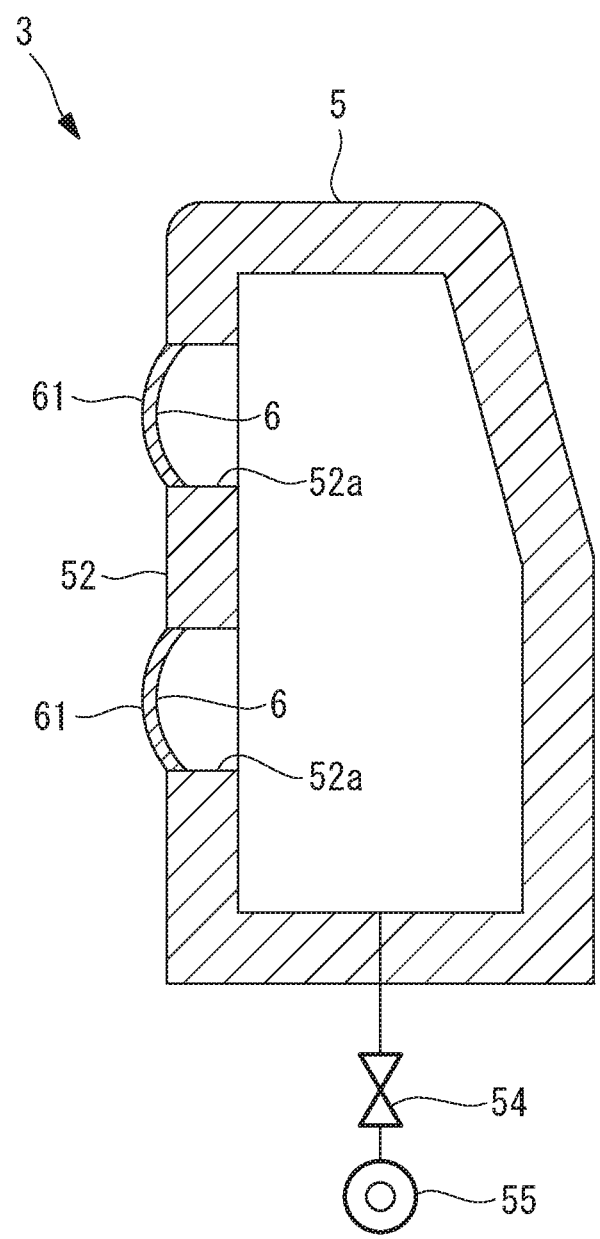
FIG. 19 is a schematic vertical sectional view of one of the finger parts and illustrates a state in which a soft workpiece is gripped with the robotic gripping device illustrated in FIG. 18.

Instead of moving the first finger members 5 or the second finger members 6 in the longitudinal direction of the finger parts 3 to switch between the two finger members 5 and 6, as illustrated in FIGS. 18 and 19, each finger part 3 may include an enclosed and hollow first finger member 5 that has a flat plate-shaped gripping surface (first gripping surface) 52 in which at least one through hole 52a penetrating through in the thickness direction is formed, and film-like second finger members 6 that close the through holes 52a to create a sealed state. In the drawings, reference sign 54 denotes a valve, and reference sign 55 denotes a compressed air supply.

When a hard workpiece W1 is to be gripped, as illustrated in FIG. 18, the inner pressure of the first finger member 5 is reduced so that the second finger members 6 are on the inner side with respect to the gripping surface 52 of the first finger member 5. In contrast, when a soft workpiece W2 is to be gripped, the valve 54 is opened to supply pressurized air into the first finger member 5 so that, as illustrated in FIG. 19, the second finger members 6 are made to protrude from the gripping surface 52 of the first finger member 5. In this manner, pad-like second gripping surfaces 61 having a higher flexibility than the first gripping surface 52 are formed.

This structure is advantageous in that the gripping surface 52 and the gripping surfaces 61 can be arranged at substantially the same position in the length direction of the finger part 3, and, thus, there is no need to switch the tool center point for the workpieces W1 and W2. In addition, since fewer movable parts are used, the structure can be simplified and can be made smaller and more lightweight.

Instead of the second finger members 6 that are made to protrude from the first gripping surface 52 by expansion with pressurized air, second finger members 6 that move within the through holes 52a in the thickness direction so as to protract from and retract to the through holes 52a may be employed.

Figure 20:
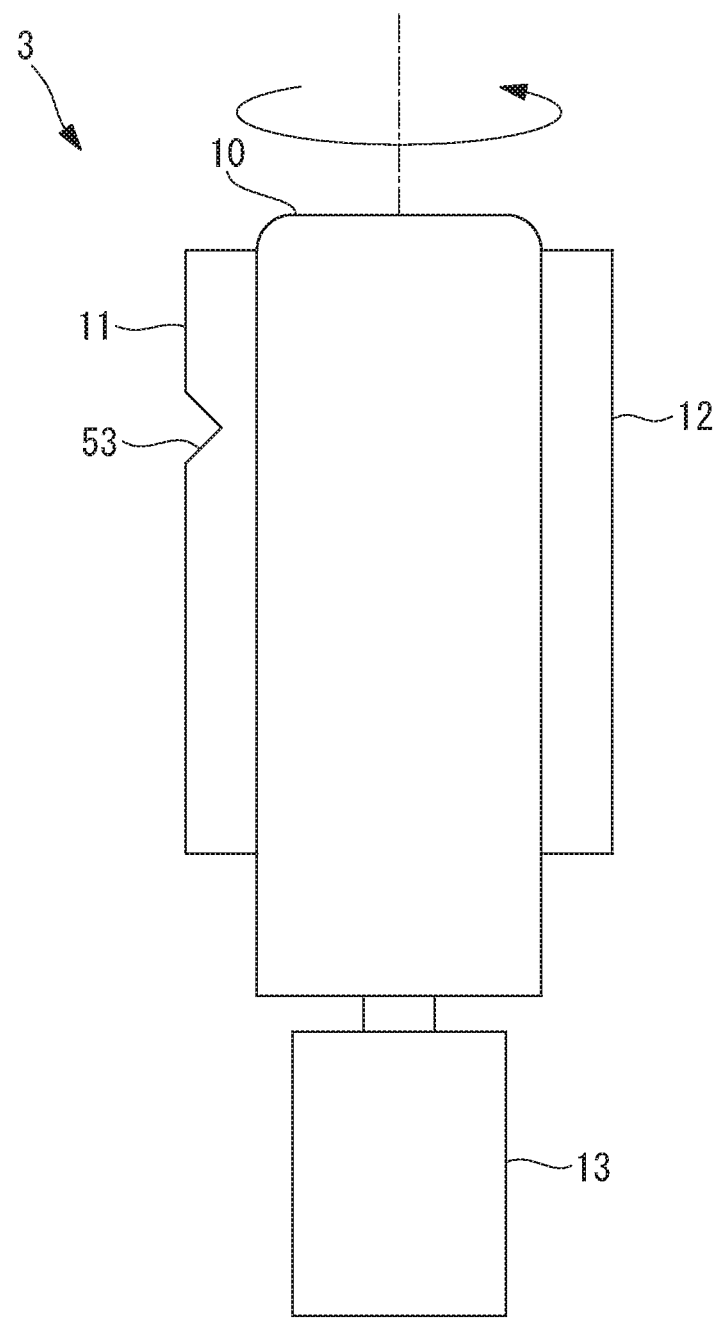
FIG. 20 is a schematic side view of one of finger parts according to another modification of the robotic gripping device illustrated in FIG. 2 and illustrates the case in which the switching between a first gripping surface and a second gripping surface is carried out by rotating the finger part about a longitudinal axis.

As illustrated in FIG. 20, each finger part 3 may have a first gripping surface (gripping surface) 11 composed of a hard material and a second gripping surface (gripping surface) 12 composed of a soft material on different surfaces of the same finger member 10 so that the switching between the first gripping surface 11 and the second gripping surface 12 is carried out by rotating the finger member 10 about the longitudinal axis by using a switching mechanism 13 such as a stepping motor.

In this case also, there is an advantage in that the first gripping surface 11 and the second gripping surface 12 can be arranged at substantially the same position in the length direction of the finger part 3, and, thus, there is no need to switch the tool center point for the workpieces W1 and W2. In addition, the structure can be simplified and can be made smaller and more lightweight.

In this case also, there is an advantage in that the gripping surface 11 and the gripping surfaces 12 can be arranged at substantially the same position in the length direction of the finger part 3, and that there is no need to switch the tool center point according to the workpieces W1 and W2. Other advantages are that the structure is simplified, and size and weight reduction can be achieved.

In this case, when the finger member 10 is formed as a rectangular prism, gripping surfaces composed of materials having different hardness or shapes may be disposed on all of the four surfaces, and the switching may be carried out according to the type of the workpiece W1 or W2 to be handled.

As a result, the following aspect is derived from the above described embodiment.

According to an aspect of the present invention, there is provided a robotic gripping device that includes a base part to be attached to a tip of a wrist of a robot; a plurality of finger parts, at least one of which is movably supported on the base part so that that the finger parts can move toward and away from each other; and a driving mechanism that drives each of the plurality of finger parts, in which, in at least one of the finger parts, flexibility of at least a gripping surface is switchable.

According to this aspect, when a soft workpiece is to be gripped, the gripping surface of at least one finger part is switched to one having high flexibility, and then the driving mechanism is actuated so that the finger parts arranged to oppose each other with the workpiece therebetween move close to each other. Thus, the soft workpiece can be gripped by deforming the gripping surfaces without applying excessive gripping force to the soft workpiece. In contrast, when a hard workpiece is to be gripped, the gripping surface of the finger part is switched to one having low flexibility, and then the driving mechanism is actuated so that the finger parts arranged to oppose each other with the workpiece therebetween move close to each other. Thus, a large gripping force can be applied to the hard workpiece through the gripping surface having low flexibility, and the workpiece can be more securely gripped.

In the aspect described above, a control unit that controls the driving mechanism may be further provided, and, in response to the switching of the flexibility of the gripping surface of the finger part, the control unit may switch a control system for the driving mechanism.

According to this feature, when the flexibility of the gripping surface of the finger part is switched to high, the control unit can switch the control system to a system of driving the finger parts with a small force and actuate the driving mechanism. When the flexibility of the gripping surface of the finger part is switched to low, the control unit can switch the control system to a system of driving the finger parts with a large force and actuate the driving mechanism. Thus, the workpiece can be gripped with a gripping force appropriate for the type of the workpiece.

In the aspect described above, the finger part may include two types of finger members that can move relative to each other in a longitudinal axis direction of the finger part and that have the gripping surfaces having different flexibility, and a switching mechanism that moves the finger members relative to each other.

According to this feature, by actuating the switching mechanism to move two types of finger members relative to each other in the longitudinal axis direction, the workpiece can be gripped by using the gripping surface of the finger member disposed on the tip side with respect to the other finger member. In other words, when a soft workpiece is to be gripped, the finger member having a gripping surface with high flexibility is placed on the tip side in the longitudinal axis direction with respect to the finger members having a gripping surface with low flexibility; and when a hard workpiece is to be gripped, the finger member having a gripping surface with low flexibility is placed on the tip side in the longitudinal axis direction with respect to the finger member having a gripping surface with high flexibility.

In the aspect described above, the finger part may include a cylindrical first finger member that is fixed so as not to move in the longitudinal axis direction and that has an opening at a tip, and a second finger member that has the gripping surface having flexibility higher than that of the first finger member and that can protract from and retract to an interior of the first finger member in the longitudinal axis direction through the opening.

According to this feature, when a hard workpiece is to be gripped, the second finger member having a gripping surface with high flexibility is housed inside the first finger member having a gripping surface with low flexibility, and the first finger member having the gripping surface with low flexibility is placed on the tip side in the longitudinal axis direction. In contrast, when a soft workpiece is to be gripped, the second finger member having a gripping surface with high flexibility is caused to protrude from the opening at the tip of the first finger member having a gripping surface with low flexibility so that the second finger member is placed on the tip side in the longitudinal axis direction.

In the aspect described above, the finger part may include a second finger member that is fixed so as not to move in the longitudinal axis direction, and a first finger member that has the gripping surface having flexibility lower than that of the second finger member and that is configured to move between a position at which the first finger member covers the gripping surface of the second finger member and a position at which the first finger member exposes the gripping surface of the second finger member.

Due to this feature, when the first finger member is positioned to cover the gripping surface of the second finger member, a hard workpiece can be gripped with gripping surfaces with low flexibility by bringing the finger parts close to each other by the driving mechanism. Meanwhile, when the first finger member is positioned to expose the gripping surface of the second finger member, a soft workpiece can be gripped with gripping surfaces with high flexibility by bringing the finger parts close to each other by the driving mechanism.

In the aspect described above, the finger part may include a finger member that has two types of the gripping surfaces disposed about a longitudinal axis of the finger part, the gripping surfaces having different flexibility, and a switching mechanism that switches the gripping surface by rotating the finger member about the longitudinal axis.

Due to this feature, by actuating the switching mechanism to rotate the finger member about the longitudinal axis and place one of the gripping surfaces at a position opposing the gripping surface of the other finger part, the workpiece can be gripped with gripping surfaces appropriate for the workpiece. In other words, when a soft workpiece is to be gripped, a gripping surface with high flexibility is placed to oppose the other finger part, and when a hard workpiece is to be gripped, a gripping surface with low flexibility is placed to oppose the other finger part.

In the aspect described above, the finger part may include a hollow first finger member that has a first gripping surface on an outer circumferential side of the finger part and at least one through hole penetrating in a thickness direction, a second finger member that can be protracted from and retracted to the first gripping surface through the through hole, the second finger member having higher flexibility than the first finger member, and a second gripping surface having higher flexibility than the first gripping surface may be formed by causing the second finger member to protrude from the first gripping surface.

Due to this structure, when a soft workpiece is to be gripped, the second finger member having higher flexibility than the first finger member is made to protrude from the first gripping surface through the at least one through hole penetrating the plate-shaped first finger member in the thickness direction so as to form a second gripping surface. In contrast, when a hard workpiece is to be gripped, the second finger member is retracted from the first gripping surface. As a result, a workpiece can be gripped with an appropriate gripping force according to the type of the workpiece.

The invention claimed is:

1. A robotic gripping device comprising:
   a base part to be attached to a tip of a wrist of a robot;
   a plurality of finger parts, at least one of which is movably supported on the base part so that that the finger parts can move toward and away from each other; and
   a driving mechanism that drives each of the plurality of finger parts,
   wherein, in at least one of the finger parts, flexibility of at least a gripping surface is switchable, and
   wherein the finger part includes two types of finger members that can move relative to each other in a longitudinal axis direction of the finger part and that have the gripping surfaces having different flexibility, and a switching mechanism that moves the finger members relative to each other.

2. The robotic gripping device according to claim 1, further comprising:
   a control unit that controls the driving mechanism,
   wherein, in response to the switching of the flexibility of the gripping surface of the finger part, the control unit switches a control system for the driving mechanism.

3. The robotic gripping device according to claim 1, wherein the finger part includes a cylindrical first finger member that is fixed so as not to move in the longitudinal axis direction and that has an opening at a tip, and a second finger member that has the gripping surface having flexibility higher than that of the first finger member and that can protract from and retract to an interior of the first finger member in the longitudinal axis direction through the opening.

4. The robotic gripping device according to claim 1, wherein the finger part includes a second finger member that is fixed so as not to move in the longitudinal axis direction, and a first finger member that has the gripping surface having flexibility lower than that of the second finger member and that is configured to move between a position at which the first finger member covers the gripping surface of the second finger member and a position at which the first finger member exposes the gripping surface of the second finger member.

5. A robotic gripping device comprising:
   a base part to be attached to a tip of a wrist of a robot;
   a plurality of finger parts, at least one of which is movably supported on the base part so that that the finger parts can move toward and away from each other; and
   a driving mechanism that drives each of the plurality of finger parts,
   wherein, in at least one of the finger parts, flexibility of at least a gripping surface is switchable, and
   wherein the finger part includes a finger member that has two types of the gripping surfaces disposed about a longitudinal axis of the finger part, the gripping surfaces having different flexibility, and a switching mechanism that switches the gripping surface by rotating the finger member about the longitudinal axis.

6. A robotic gripping device comprising:
   a base part to be attached to a tip of a wrist of a robot;
   a plurality of finger parts, at least one of which is movably supported on the base part so that that the finger parts can move toward and away from each other; and
   a driving mechanism that drives each of the plurality of finger parts, wherein, in at least one of the finger parts, flexibility of at least a gripping surface is switchable, and wherein the finger part includes a hollow first finger member that has a first gripping surface on an outer circumferential side of the finger part and at least one through hole penetrating in a thickness direction, a second finger member that can be protracted from and retracted to the first gripping surface through the through hole, the second finger member having higher flexibility than the first finger member, wherein a second gripping surface having higher flexibility than the first gripping surface is formed by causing the second finger member to protrude from the first gripping surface.

* * * * *